United States Patent Office 3,141,043
Patented July 14, 1964

3,141,043
CYCLOPENTADIENYLIMINES, PROCESS FOR THEIR PRODUCTION AND CONDENSATION PRODUCTS THEREOF
Earl T. McBee, Lafayette, Ind., assignor to Purdue Research Foundation, West Lafayette, Ind., a corporation of Indiana
No Drawing. Filed Mar. 24, 1961, Ser. No. 98,030
10 Claims. (Cl. 260—566)

This invention relates to a process for making compositions of matter classified in the art of chemistry as cyclopentadienylimine compounds and to the novel compositions produced thereby.

The invention sought to be patented, in its process aspect, resides in the concept of preparing tetrachlorocyclopentadienylimine compounds by the reaction of hexachlorocyclopentadiene with compounds of the formula $H_2N$—Z, wherein Z represents a hydroxyl group, an amino group, or a substituted amino group.

The invention sought to be patented, in its composition aspect, resides in the concept of the novel tetrachlorocyclopentadienylimine compounds produced by the above process. The inventive concept also embraces the adducts formed by the Diels-Alder addition of tetrachlorocyclopentadienylimine compounds with conjugated dienes.

The tangible embodiments of this invention are darkly colored solids melting above 100 degrees centigrade. They are useful as chemical intermediates and in the control of fungus diseases of plants.

The manner and process of making and using this invention is illustrated by the following general description and examples, which set forth the best mode contemplated by me of carrying out the invention so as to enable any person skilled in the art of chemistry to make and use the same:

The primary process of the present invention involves the reaction of hexachlorocyclopentadiene with hydroxylamine, hydrazine or a hydrazine substituted on one nitrogen atom only with from 1 to 2 of alkyl, cycloalkyl and aryl, preferably monocyclic aryl, to produce a tetrachlorocyclopentadienylimine, which reaction and which compounds may be illustrated by the equation

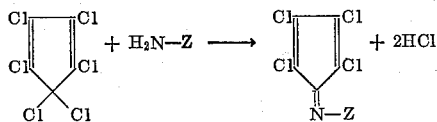

wherein Z represents a hydroxyl group, an amino group, or a substituted amino group. The latter term is to be construed broadly and can be most conveniently symbolized as

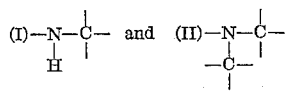

in (I) and (II), the valence from the nitrogen atom is the point of attachment in $H_2N$—Z, Z being represented by (I) and (II) above. The remaining valences from the carbon atoms can be satisfied by an organic radical. The structure (I) constitutes a preferred sub-class in which only one of the amino hydrogens of Z is substituted. In structure (II), both of the amino hydrogens are substituted. In order to maintain the character of the Z substituent in $H_2N$—Z as a substituted amine, the substituents in (I) and (II) above are symbolized as having a carbon atom attached to the nitrogen atom. As stated previously, the remaining valences can be satisfied by any organic radical. The presence of competing functional groups on the substituent radical will not make the present process inoperative. The $H_2N$— group of $H_2N$—Z will react with hexachlorocylopentadiene as before save that more of that reactant may be required to satisfy the demands of all of the reacting functional groups. It cannot be too strongly emphasized that even under these unusual conditions, the ultimate product would still be a tetrachlorocyclopentadienylimine compound coming within the ambit of this invention.

It is apparent that when Z is a substituted amine, $H_2N$—Z constitutes a substituted hydrazine compound. The following non-limiting list includes some of the types of substituted hydrazines suitable for the practice of this invention.

mono- and dihydrocarbylhydrazines
        mono- and dialkylhydrazines
        mono- and dicycloalkylhydrazines
        mono- and diarylhydrazines
        mono- and diaralkylhydrazines The disubstituted hydrazines are unsymmetrical and may have the same or different substituents or the substituents may be mixed in type, i.e., alkyl and aryl. The various substituents may in turn bear further substituents, such as halo, nitro, alkoxy, dialkylamino, acyl, carboalkoxy, trifluoromethyl, etc. The hydrocarbyl substituents may be saturated or unsaturated and unsubstituted or substituted. The aryl substituents may be carbocyclic or heterocyclic and unsubstituted or substituted. Other variations and combinations will suggest themselves to those skilled in the art of chemistry.

In summary, the inventive concept here embraces the preparation of tetrachlorocyclopentadienylimine compounds by the reaction of hexachlorocyclopentadiene with monosubstituted or 1,1 - disubstituted hydrazine compounds. There is a simple test for seeing whether such substituted compounds fall within the ambit of the present process. Consider the unsubstituted amino group of the hydrazine under consideration. If changing it to a methyl group would yield an amine, the hydrazine compound under consideration is suitable for use in the present invention.

As is well known, alkyl hydrazines, particularly loweralkyl hydrazines, and arylhydrazines, particularly phenylhydrazine and phenylhydrazine bearing the usual benzene ring substituent, i.e., lower-akyl, nitro, etc., are readily available. The use of such hydrazines constitutes a preferred embodiment in the practice of this invention.

The process of this invention is most conveniently effected in the presence of an unreactive organic solvent. By unreactive is meant that the solvent is unaffected by and stable to the reactants, products and reaction conditions of the present process. Suitable unreactive solvents will be readily recognized by those skilled in the art as including but not limited to lower-alkyl alcohols such as methanol and ethanol and chlorinated hydrocarbons such as chloroform and carbon tetrachloride. Lower-alkyl alcohols containing less than four carbon atoms constitute a preferred class of solvents.

The precise conditions under which the reactants are contacted are not critical. Although reaction temperatures in the range of 0 to 100 degrees centigrade or the boiling point of the solvent employed are most convenient, the reaction may be effective at higher or lower temperatures. Superior yields are obtained when the nitrogenous reactant is in excess with respect to hexachlorocyclopentadiene and when the reactants are allowed to remain in contact with each other for a long period of time. The resultant product is recovered from the reaction mixture and purified by conventional techniques usually by extraction with ether and by crystallization from an appropriate solvent.

As suggested above, the tetrachlorocyclopentadienylimine compounds preparable by the process of this invention undergo the Diels-Alder reaction with conjugated dienes; this behavior of the imine as a dienophile is general in nature and adducts will be obtained with all 1,3-dienes that undergo the Diels-Alder reaction with carbonyl-activated double bonds. Suitable dienes include acyclic dienes such as butadiene, 1,3-pentadiene, isoprene, 1,3- or 2,4-hexadiene, 2,3-dimethylbutadiene, 1-phenylbutadiene, 4-phenyl-1,3-pentadiene, 6-phenyl-1,3-hexadiene, 1-naphthylbutadiene, 2-chlorobutadiene, 5,6-dibromo-1,3-hexadiene, 2,3-dimethoxybutadiene, 3-chloro-5-methoxy-1,3-pentadiene, 2-acetoxybutadiene, and the like. Alicyclic dienes such as cyclopentadiene, 1,5,5-trimethyl - 1,3 - cyclopentadiene, benzylcyclopentadiene, 6,6-dimethylfulvene, 1,3-cyclohexadiene, abietic acid, ergosterol acetate, and the like. Aromatic dienes such as anthracene, substituted anthracenes, benzanthracene, dibenzanthracene, perylene, substituted perylenes, isosafrole, isoeugenol methyl ether, idene, and the like. Heterocyclic dienes such as furan, substituted furans, isobenzofuran, substituted isobenzofurans, and the like. The above list is non-limiting as to the dienes that may be employed.

The Diels-Alder reaction is most conveniently effected in the presence of an unreactive organic solvent. By unreactive is meant that the solvent is unaffected by and stable to the reactants, products and reaction conditions of the diene synthesis. Suitable solvents will be readily recognized by those skilled in the art as including, but not limited to, chlorinated hydrocarbons such as chloroform and carbon tetrachloride and aromatic hydrocarbons such as benzene and toluene. Superior yields are obtained when the condensation is effected at the reflux temperature of the solvent employed and when the reactants are allowed to remain in contact with each other for a long period of time. The adduct is recovered from the reaction mixture and purified by conventional techniques usually by removal of the solvent and decolorization of the residue with charcoal in a second solvent followed by fractional crystallization.

The tetrachlorocyclopentadienylimine-diene adducts of this invention is lightly colored crystalline compounds melting above 100 degrees centigrade. They are complex polycyclic compounds, the structure of which depends on the nature of the diene employed. For example, with cyclopentadienes compounds of the type

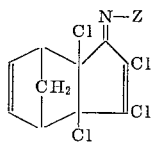

are obtained (where Z has the values aforesaid). Such compounds are systematically named as derivatives of tetrahydro-4,7-methanoindene-1-one numbered as indicated:

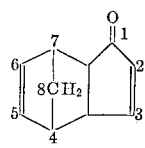

With anthracene and other aromatic hydrocarbons, compounds of the type

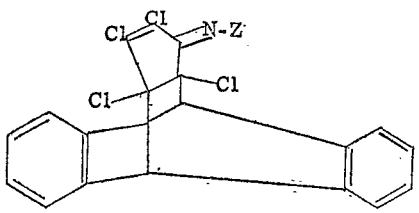

are obtained. But with acyclic dienes such as butadiene, compounds of a simpler structure will result.

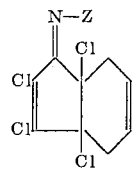

The above adducts are useful as chemical intermediates and fungicides, particularly for the treatment of fungal diseases of edible plants.

The foregoing discussion is offered to illustrate methods suitable for the practice of my invention and not to limit its scope. The following examples are further illustrative of the present invention: (All temperatures are given in degrees centigrade.)

EXAMPLE 1

*2,3,4,5-Tetrachlorocyclopentadienone Hydrazone*

Hydrazine (22.8 grams of an 85 percent aqueous solution, 0.6 mole) was added slowly to hexachlorocyclopentadiene (27.3 grams, 0.1 mole) in 200 milliliters of methanol at 0 degrees and the mixture stirred for 5 days at that temperature. The solvent was removed on a rotating evaporator and 200 milliliters of ether added to the residual red solid. After stirring well, the ether solution was decanted from the flask, washed with two 50 milliliter portions of water and dried over calcium sulfate. Two hundred milliliters of water was added to the ether residue and extracted with three 50 milliliter portions of ether. The second set of ether extracts were washed with water and dried over calcium sulfate. The two ether solutions were concentrated and the residues combined. Recrystallization from chloroform gave 18 grams of red needles melting with decomposition at 181 degrees.

Calc'd for $C_5Cl_4N_2H_2$: C, 25.86; H, 0.86; Cl, 61.20; N, 12.07. Found: C, 25.73; H, 1.01; Cl, 61.37; N, 12.33.

Hydrolysis of the product with sulfuric acid gave the known tetrachlorocyclopentadienone dimer. Since distillation of the mother liquors gave a recovery of 1.8 grams of hexachlorocyclopentadiene, the yield of 2,3,4,5-tetrachlorocyclopentadienone hydrazine was 83 percent.

EXAMPLE 2

*2,3,4,5-Tetrachlorocyclopentadienone Phenylhydrazone*

Phenylhydrazine (10.8 grams, 0.1 mole) was added slowly to hexachlorocyclopentadiene (9.1 grams, 0.033 mole) in 100 milliliters of methanol at 25 degrees. After stirring for 10 days, the methanol was evaporated and 150 milliliters of ether added to the residue. The ether solution was filtered, washed with two 100 milliliter portions of water and dried over calcium sulfate. Evaporation of the ether gave a solid which was recrystallized from hexane to give 5.2 grams of deep purple crystals, melting with decomposition at 134 degrees.

Calc'd for $C_{11}H_6Cl_4N_2$: C, 42.86; H, 1.95; Cl, 46.05; N, 9.10. Found: C, 43.22; H, 2.09; Cl, 45.72; N, 9.46.

Since distillation of the hexane gave a recovery of 1.1 grams of hexachlorocyclopentadiene, the yield of 2,3,4,5-tetrachlorocyclopentadienone phenylhydrazone was 58 percent. This product was prepared via a different method by Roedig et al., Ber., 88, 2003 (1955).

EXAMPLE 3

*2,3,4,5-Tetrachlorocyclopentadienone Oxime*

Hydroxylamine hydrochloride (41.0 grams, 0.6 mole) in 200 milliliters of methanol was added to potassium hydroxide (33.6 grams, 0.6 mole) in 200 milliliters of the same solvent. The resultant potassium chloride was filtered and the hydroxylamine solution added to hexachlorocyclopentadiene (27.3 grams, 0.1 mole) in 100 milliliters of methanol. After stirring under reflux for 5 days most of the solvent was removed by evaporation, the resulting solution poured into 200 milliliters of water and extracted with ether. After washing with water and drying with calcium sulfate, the ether was evaporated and the residue recrystallized from carbon tetrachloride to give 8.0 grams of red needles melting at 170.5 degrees.

Calc'd for $C_5Cl_4NOH$: C, 25.78; H, 0.43; N, 6.01; Cl, 60.90. Found: C, 25.92; H, 0.21; N, 5.90; Cl, 61.30.

On distillation of the combined mother liquors, 11.3 grams or about 40 percent of unreacted hexachlorocyclopentadiene was recovered. Thus the amount converted was 34 percent and the yield of 2,3,4,5-tetrachlorocyclopentadienone oxime, previously prepared via a different method by Roedig et al., supra, was 60 percent.

EXAMPLE 4

*Adduct of Cyclopentadiene and 2,3,4,5-Tetrachlorocyclopentadienone Hydrazone*

Cyclopentadiene (3.3 grams, 0.05 mole) and 2,3,4,5-tetrachlorocyclopentadienone hydrazone (10 grams, 0.04 mole) were added to 100 milliliters of chloroform and heated at reflux for 4 days. The solvent was removed and the residue treated with hot hexane. The mixture was filtered to give some carbon and insoluble material. The latter was dissolved in ether, the ether evaporated and the residue recrystallized from chloroform to give 1.5 grams of unreacted 2,3,4,5-tetrachlorocyclopentadienone hydrazone. The hexane solution was twice decolorized with activated charcoal and then cooled to give 6.6 grams or a 61 percent yield of light yellow crystals of 2,3,3a,7a-tetrachloro-3a,4,5,5a-tetrahydro-4,7-methanoindene-1-one hydrazone melting 108–108.5 degrees.

Calc'd for $C_{10}H_8Cl_4N_2$: C, 40.27; H, 2.68; Cl, 47.65; N, 9.40. Found: C, 40.34; H, 3.02; Cl, 47.66; N, 9.02.

EXAMPLE 5

*Adduct of Cylopentadiene and 2,3,4,5-Tetrachlorocyclopentadienone Phenylhydrazone*

Cyclopentadiene (1.65 grams, 0.025 mole) and 2,3,4,5-tetrachlorocyclopentadienone phenylhydrazone (7 grams, 0.023 mole) were added to 75 milliliters of chloroform and the mixture heated at reflux for 4 days. The solvent was removed by evaporation, the residue treated with hot hexane and filtered to give some carbon. The hexane solution was decolorized with activated charcoal and cooled but no crystals were obtained. The red oil obtained on evaporation of the solvent was dissolved in a small amount of hexane and put through a 15 centimeter by 20 millimeter column packed with acid washed aluminum oxide containing a small amount of activated carbon. A small fraction containing 0.05 gram of colorless solid was followed by a series of fractions totaling about 4 grams of the product as a red oil. A middle cut was analyzed to give results in agreement with that calculated for 2,3,3a,7a-tetrachloro-3a,4,7,7a-tetrahydro-4,7-methanoindene-1-one phenylhydrazone.

Calc'd for $C_{16}H_{12}Cl_4N_2$: C, 51.33; H, 3.21; Cl, 37.97; N, 7.48. Found: C, 51.42; H, 3.45; Cl, 37.71; N, 7.56.

The final fractions contained 1.1 grams of unreated 2,3,4,5-tetrachlorocyclopentadienone phenylhydrazone giving a product yield of about 60 percent.

EXAMPLE 6

*Adduct of Cyclopentadiene and 2,3,4,5-Tetrachlorocyclopentadienone Oxime*

Cyclopentadiene (1.05 gram, 0.022 mole) and 2,3,4,5-tetrachlorocyclopentadienone oxime (5.0 grams, 0.022 mole) were refluxed in 100 milliliters of benzene for 12 hours. After removal of the solvent the residual black gum was dissolved in petroleum ether and decolorized with charcoal. Upon cooling, 4.5 grams of a 70 percent yield of 2,3,3a,7a-tetrachloro-3a,4,7,7a-tetrahydro-4,7-methanoindene-1-one oxime was obtained melting at 134 degrees.

Calc'd for $C_{10}H_7Cl_4NO$: C, 40.13; H, 2.34; Cl, 47.49; N, 4.68. Found: C, 40.23; H, 2.97; Cl, 47.01; N, 4.73.

EXAMPLE 7

*Isomerization of 2,3,3a,7a-Tetrachloro-3a,4,7,7a-Tetrahydro-4,7-Methanoindene-1-One Oxime*

2,3,3a,7a-tetrachloro-3a,4,7,7a-tetrahydro-4,7-methanoindene-1-one oxime (5 grams, 0.017 mole) prepared according to the method of Example 6 was added to a mixture of 25 milliliters sulfuric acid, 25 milliliters of acetic acid and 25 milliliters of water. This solution was stirred and heated on a steam cone for 3 hours, cooled and added to 200 milliliters of water. After extraction with 100 milliliters of ether, the ether layer was washed with water and dried over calcium sulfate. The ether was evaporated and the solid recrystallized and decolorized with charcoal from petroleum ether. After cooling, the crystals that formed were filtered to give 3.5 grams or a 70 percent yield of a product melting 163–164 degrees.

Calc'd for $C_{10}H_7Cl_4NO$: C, 40.13; H, 2.34; Cl, 47.49; N, 4.68. Found: C, 40.40; H, 2.36; Cl, 48.08; N, 4.74.

The reaction constitutes a rearrangement probaly from the syn to the anti oxime.

Acid hydrolysis (conveniently with 20 percent sulfuric acid) of the various 2,3,4,5-tetrachlorocyclopentadienylimine compounds prepared by the process of the present invention yields the dimer of 2,3,4,5-tetrachlorocyclopentadienone. Hydrolysis of the various adducts gives the corresponding ketone.

2,3,4,5-tetrachlorocyclopentadienone hydrozone, a typical compound prepared by the present precess, prevented damping-off of peas due to Pythium when admixed into the soil at a rate of 50 parts per million and gave 98 percent control tomato early blight at 400 part per million.

Other variations of our invention will be apparent to those skilled in the art and our invention is not to be limited to the above-offered illustrative examples. The subject matter which the applicant regards as his invention is particularly pointed out and distinctly claimed as follows:

1. A process for preparing imine compounds of the formula

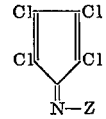

wherein Z is a member selected from the group consisting of hydroxyl, amino, primary amino and secondary amino which includes reacting hexachlorocyclopentadiene with a compound selected from the group consisting of hydroxylamine, hydrazine and hydrazines substituted on one nitrogen atom only with from 1 to 2 of alkyl, cycloalkyl and aryl, in the presence of an unreactive organic solvent and recovering the said imine compounds from the reaction mixture.

2. A process according to claim 1 wherein Z is hydroxyl.

3. A process according to claim 1 wherein the $H_2N$—Z reactant is in excess with respect to hexachlorocyclopentadiene.

4. A process according to claim 1 wherein the organic solvent is a lower-alkyl alcohol.

5. 2,3,4,5-tetrachlorocyclopentadienone hydrazone.

6. Compounds having the formula

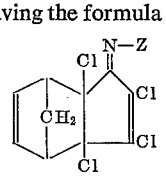

wherein Z is a member selected from the group consisting of hydroxyl, —$NH_2$, —NHR and —NRR wherein R in each instance is selected from the group consisting of alkyl, cycloalkyl and monocyclic aryl.

7. 2,3,3a,7a - tetrachloro-3a,4,7,7a - tetrahydro-4,7-methanoindene-1-one hydrazone.

8. 2,3,3a,7a - tetrachloro - 3a,4,7,7a - tetrahydro-4,7-methanoindene-1-one phenylhydrazone.

9. A compound of the formula

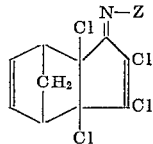

wherein Z is hydroxyl.

10. A compound according to claim 9 having a melting point of 134° C.

References Cited in the file of this patent

UNITED STATES PATENTS

| 2,616,928 | Gilbert et al. | Nov. 4, 1952 |
| 2,741,641 | Kleiman | Apr. 10, 1956 |
| 2,972,563 | Richter | Feb. 21, 1961 |
| 3,000,973 | Goldman et al. | Sept. 19, 1961 |

OTHER REFERENCES

Roedig et al. Ber. Deut. Chem., vol 88, pp. 2003–2011 (1955).